United States Patent [19]

Nguyen-Tuong et al.

[11] Patent Number: 5,683,783
[45] Date of Patent: Nov. 4, 1997

[54] ULTRA HIGH VACUUM BROAD BAND HIGH POWER MICROWAVE WINDOW

[75] Inventors: Viet Nguyen-Tuong, Seaford; Henry Frederick Dylla, III, Yorktown, both of Va.

[73] Assignee: Southeastern Universities Research Ass., Inc., Newport News, Va.

[21] Appl. No.: 150,596

[22] Filed: Nov. 10, 1993

[51] Int. Cl.⁶ .................. B32B 23/02; B32B 13/12; C03C 27/00
[52] U.S. Cl. .................. 428/192; 428/34; 428/167; 428/451; 428/702; 156/107
[58] Field of Search .................. 428/34, 461, 462, 428/192, 172, 167, 451, 81, 702, 704; 156/107, 109; 52/786.1

[56] References Cited

U.S. PATENT DOCUMENTS

| | | | |
|---|---|---|---|
| 3,818,333 | 6/1974 | Walker | 324/58.5 A |
| 4,106,859 | 8/1978 | Doriguzzi et al. | 428/141 |
| 4,414,254 | 11/1983 | Iwata et al. | 428/34 |
| 4,450,201 | 5/1984 | Brill et al. | 428/336 |
| 4,895,767 | 1/1990 | Mori et al. | 428/447 |
| 4,931,756 | 6/1990 | Doehler et al. | 333/252 |
| 5,110,637 | 5/1992 | Ando et al. | 428/34 |
| 5,190,807 | 3/1993 | Kimick et al. | 428/457 |

*Primary Examiner*—Donald Loney

[57] ABSTRACT

An improved high vacuum microwave window has been developed that utilizes high density polyethylene coated on two sides with SiOx, SiNx, or a combination of the two. The resultant low dielectric and low loss tangent window creates a low outgassing, low permeation seal through which broad band, high power microwave energy may be passed. No matching device is necessary and the sealing technique is simple. The features of the window are broad band transmission, ultra-high vacuum compatibility with a simple sealing technique, low voltage standing wave ratio, high power transmission and low cost.

9 Claims, 4 Drawing Sheets

5,683,783

ULTRA HIGH VACUUM BROAD BAND HIGH POWER MICROWAVE WINDOW

The United States may have certain rights to this invention, under Management and Operating Contract DE-AC05-84ER40150 from the United States Department of Energy.

FIELD OF THE INVENTION

This invention relates to a method and apparatus for creating a sealed window for the passage of microwave energy. A seal is created between an ambient pressure area on one side and a vacuum area on the opposite side of the window. This particular invention relates to an improved window that features broad band microwave transmission, ultra-high vacuum compatibility, low voltage standing wave ratio (VSWR), high power transmission, a simple sealing technique and low cost.

BACKGROUND OF THE INVENTION

Presently available ultra high vacuum microwave windows are based on the use of low outgassing, low permeation and low loss dielectric materials such as alumina or glass. As a result of their high dielectric constant, these materials require a matching device such as a resonant aperture which is frequency sensitive and the resulting band width is usually narrow. They also require ceramic or glass-to-metal seals. Thin sheets or plates of low dielectric constant material like Teflon, Kapton (both registered trademarks of E. I. Dupont de Nemours Company of Wilmington, Del.), or polyethylene are relatively transparent to broad band radio frequency (rf) or microwave energy but their vacuum properties are not adequate for ultra-high vacuum as a result of their high permeation to gases.

Benderly and Kilduff, in the March, 1961 issue of the Microwave Journal, present a method of sealing a waveguide with a 0.005 inch thick film of polytetrafluoroethylene, or Teflon. By virtue of its low dielectric constant, approximately 2.0, a matching device is not required. However, the Teflon window is limited to pressure differentials of approximately 25 psi. The Teflon film thickness may be increased to 0.010 inch, but this has the disadvantage of increasing the VSWR from 1.08 to slightly in excess of 1.1. Teflon film also has the disadvantage of being less resistant to radiation and permeation than the HDPE window of this invention.

SUMMARY OF THE INVENTION

This invention allows the use of high density polyethylene (HDPE) which has a low dielectric constant and a low loss tangent, lower than about 0.001, as a material for an ultra high vacuum microwave window. The invention is based on coating the two sides of a HDPE window with a low outgassing, low permeation material such as SiOx (includes SiO and SiO2), SiNx (includes SiN and SiN2), or a combination of the two. The vacuum properties of the HDPE window are therefore improved without losing all the advantages of its excellent dielectric and rf transmissive properties. No matching device is necessary and the sealing technique is simple. This invention allows broad band, high power microwave transmission with a low voltage standing wave ratio (VSWR), ultra-high vacuum compatibility and a simple sealing technique.

OBJECTS AND ADVANTAGES

Accordingly, several objects and advantages of this invention are:

(1) to provide a microwave window that will create a seal between two areas of pressure with up to a 45 psi or greater differential possible, (2) to provide a microwave window that will allow transmission of high power, broad band microwave energy with a low VSWR, (3) to minimize the amount of outgassing from the window and permeation of gas through the window from the high pressure to the low pressure side of the window, (4) to provide a microwave window that employs a simple sealing technique, and (5) to provide a microwave window that can be constructed at a low cost.

DESCRIPTION OF THE INVENTION

A new window has been developed for allowing the passage of broad band, high power microwave or radio frequency (rf) energy from the external waveguide system to the internal waveguide system for a linear accelerator. The window features the use of coated high density polyethylene (HDPE). The coating, applied to both sides of the HDPE window, consists of either SiOx, SiNx, or a combination of the two. A simple sealing technique is used whereby mating flanges are used to compress the HDPE window. A continuous ridge formed near the outer periphery of one of the flanges compresses and deforms the HDPE, which acts as a gasket, and causes the formation of an effective seal between the vacuum of the internal waveguide system and the ambient pressure of the external waveguide system. The internal waveguide system is typically maintained at $1 \times 10^{-8}$ Torr.

Figure 1:
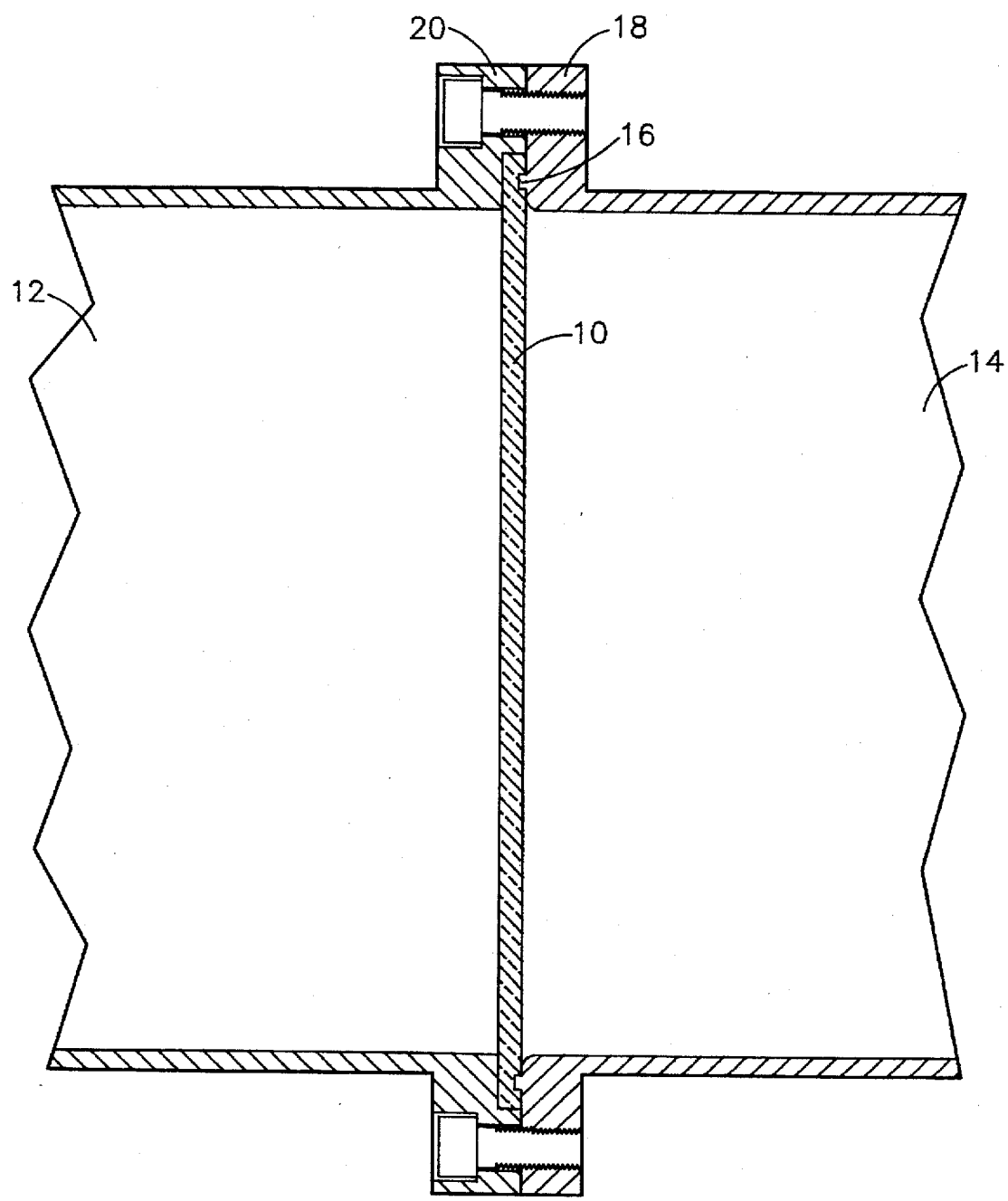
FIG. 1 is a schematic representation of the microwave window affixed in place and separating a vacuum area from the ambient pressure area.

A schematic of the microwave window affixed in place and separating the external and internal waveguide systems of the linac is shown in FIG. 1. The HDPE window 10 coated with SiOx, SiNx, or a combination of the two is depicted separating the external waveguide system 12 from the internal waveguide system 14. The external waveguide system 12 is at ambient pressure. The internal waveguide system 14 is maintained at approximately $1 \times 10^{-8}$ Torr. An internal waveguide flange 18 is depicted mated with and bolted to an external waveguide flange 20. An integral part of the internal waveguide flange 18 is the sealing ridge 16, which in the mated state as shown in FIG. 1, compresses and deforms the initially flat HDPE window plate around the sealing ridge 16 and causes an effective seal between the vacuum side and ambient pressure side of the window.

Figure 2:
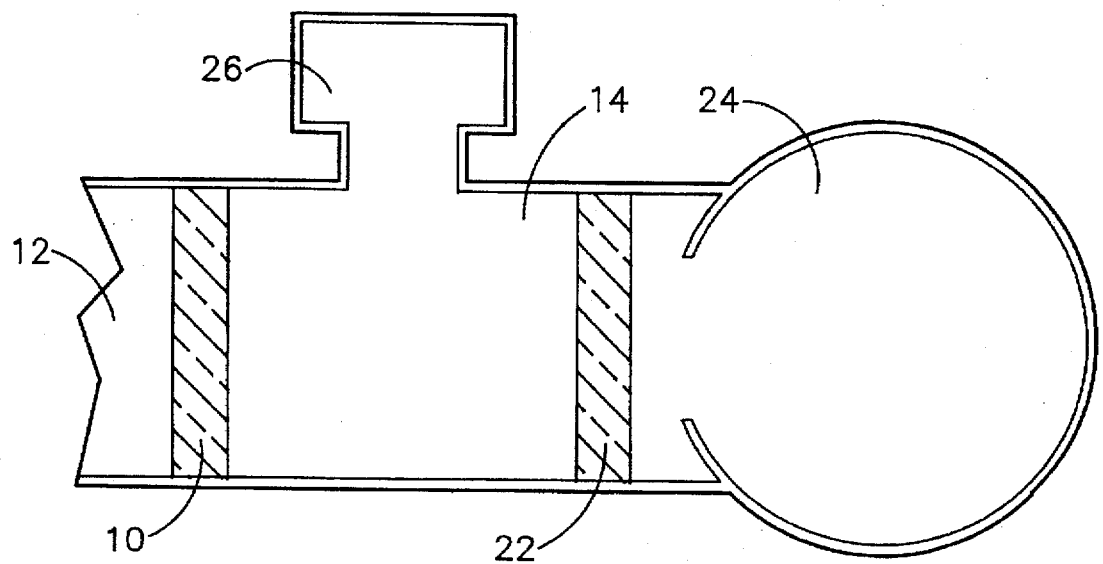
FIG. 2 is a schematic representation of the microwave or "warm" window in use in a superconducting linac and showing it in its relationship to the "cold" window into the superconducting cavity.

A schematic representation of the microwave window in use in the superconducting linac is depicted in FIG. 2. It shows the HDPE or "warm" window 10 in relationship to the "cold" window 22. The term "warm" window derives from the fact that the microwave window of this invention separates areas of pressure and vacuum that are at ambient or "warm" temperatures. The term "cold" window derives from the fact that the window 22 separating the internal waveguide system 14 from the superconducting cavity 24 is maintained at a cold temperature of 2K. The subject of this invention relates only to the HDPE or warm window 10.

FIG. 2 therefore depicts the coated HDPE window 10 separating the external waveguide system 12 at ambient pressure from the internal waveguide system 14 maintained at a vacuum of $1\times10^{-8}$ Torr. The vacuum of the internal waveguide system 14 is maintained by ion pump 26. The cold window 22 separates the internal waveguide system 14 from the superconducting cavity 24. Use of the HDPE window 10 coated with SiOx, SiNx, or a combination of the two permits the transmission therethrough of high power, broad band microwave or rf energy from the external waveguide system 12 to the internal waveguide system 14. The low dielectric constant of the coated HDPE, approximately 2.1, allows the passage of the microwave energy without the use of a matching device as required in materials having a high dielectric constant. Coating the HDPE window with SiOx, SiNx, or a combination of the two, in combination with the effective sealing technique of this invention, minimizes outgassing from the HDPE and permeation of gases from the external waveguide system 12 at ambient pressure to the internal waveguide system 14 under a vacuum such as $1\times10^{-8}$ Torr.

Figure 3:
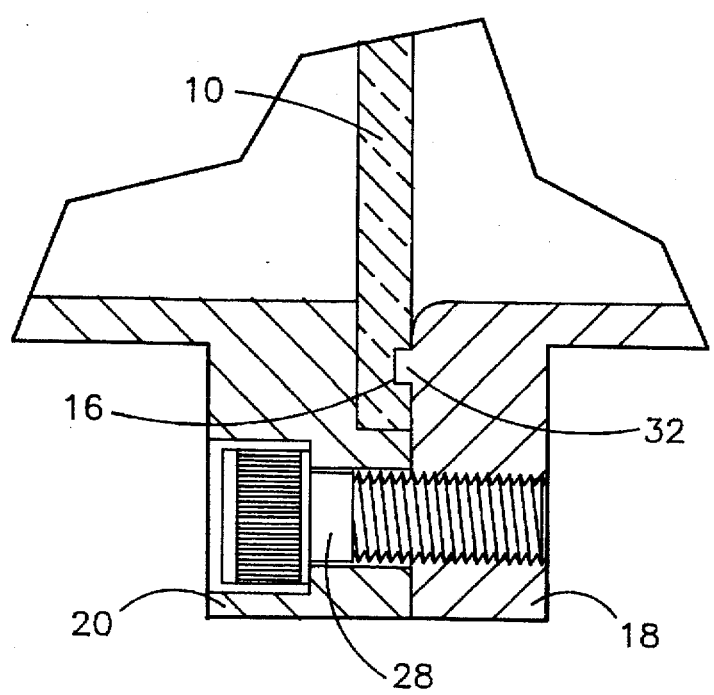
FIG. 3 is a detail drawing of the flange and window mated together.

FIG. 3 depicts the flanges and window mated together for the purposes of effecting a good seal. This figure depicts the coated HDPE window 10 compressed between the internal waveguide flange 18 and the external waveguide flange 20. The sealing ridge 16 is an integral extension of the internal waveguide flange 18. Mating holes 28 are depicted on both the external waveguide flange 20 and internal waveguide flange 18 for accommodation of means for affixing the flanges together, typically bolts or screws. A groove 32 formed by deformation and compression of the sealing ridge 16 against the initially flat coated HDPE window 10 causes an effective seal to eliminate passage of gases around the periphery of the sealed window.

Figure 4:
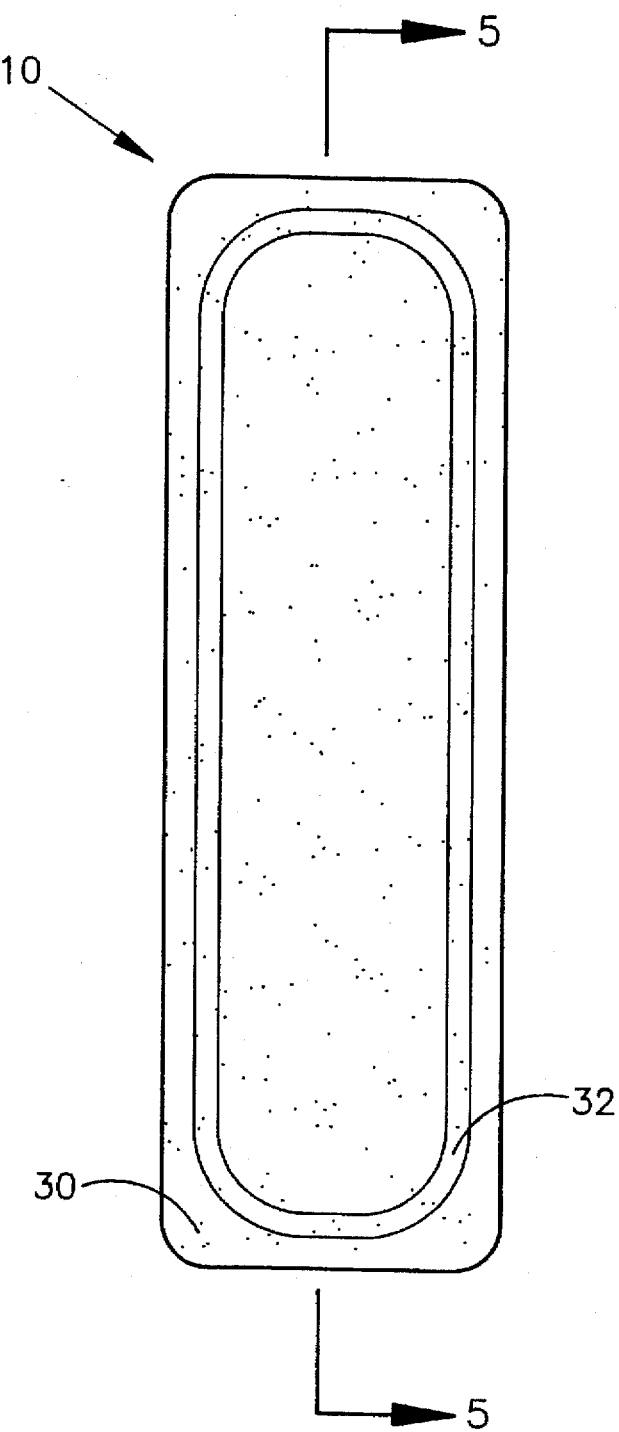
FIG. 4 is a plan view of the window depicting the groove and the top layer of coating.

A plan view of the coated HDPE window 10 after removal from its compressed and grooved state between the flanges is shown in FIG. 4. A coating 30 consisting of SiOx, SiNx, or a combination of the two is depicted by the cross-hatched area shown in FIG. 4. The coating 30 is applied preferably to both the top and bottom surfaces of the window 10. The resultant continuous groove 32 caused by compression and deformation when between the flanges is shown inward of the outer periphery of the window.

Figure 5:
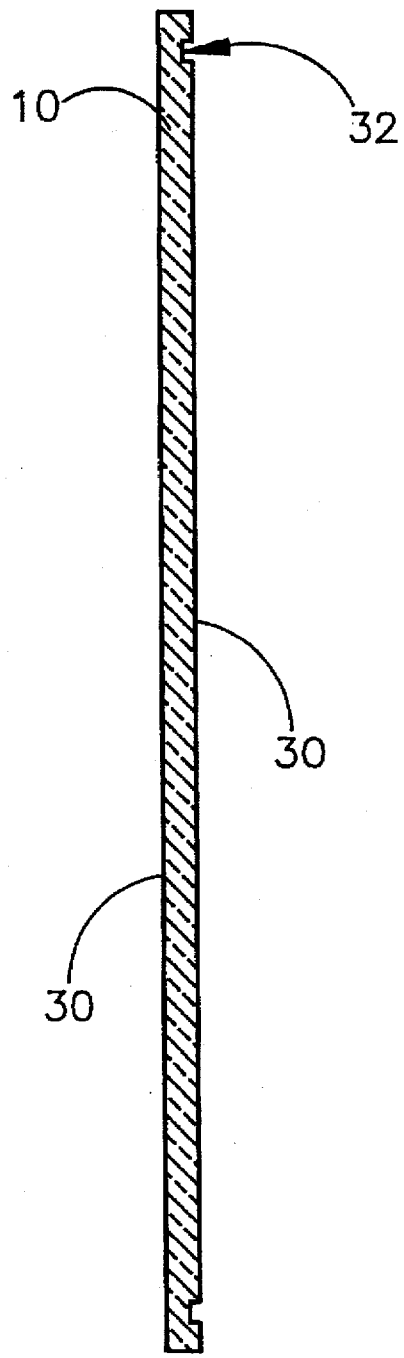
FIG. 5 is a cross-sectional view of the window showing the groove and the layer of coating on each side.

A cross-sectional view of the HDPE window 10 after removal from the compression flanges is shown in FIG. 5. The window 10 is depicted with a coating layer 30 on both the top and bottom surfaces of SiOx, SiNx, or a combination of the two. The resultant groove 32 caused by the compression flanges and the ridge on the internal waveguide flange is depicted on the top surface in the figure.

The warm window is typically constructed of 3.2 mm thick HDPE plate with a dielectric constant of 2.1, but may be any other polymer with a low dielectric constant of less than 2.5, a low loss tangent of lower than about 0.001, and the integrity to withstand the pressure differential of approximately 45 psi. PET, or polyethylene terethalate, for example may be an acceptable substitute.

The coating layer of SiOx, SiNx, or a combination of the two, or materials having similar properties, is applied to each side of the HDPE window. Coating thickness is usually greater than 100 nm and typically approximately 300 nm. Techniques for applying the coating may be any of the following methods which are disclosed in the following documents which are herein incorporated by reference:

(1) a plasma enhanced chemical vapor deposition method such as that reported by L. Wood and H. Chatham at the 35th Annual Technical Conference, Society of Vacuum Coaters, 22–27 Mar. 1992, Baltimore, Md., (2) evaporation of an inorganic oxide or nitride of silicon by their evaporation with an electron beam heating in a vacuum enclosure, such as that reported in U.S. Pat. No. 3,442,686, (3) vacuum deposition of an inorganic oxide per U.S. Pat. Nos. 5,084,356 and 5,085,904.

Also referred to and herein incorporated by reference is a paper by one of the inventors entitled Gas Permeation Through a High Density Polyethylene Microwave Window published July/August 1993 at pages 1584 to 1586 in the Journal of Vacuum Science Technology.

While there has been shown and described what is at present considered the preferred embodiment of the present invention, it will be obvious to those skilled in the art that various changes and modifications may be made therein without departing from the scope of the invention as defined by the appended claims.

What is claimed is:

1. An ultra-high vacuum microwave window comprising:
   a plate of high density polymer with a dielectric constant less than 2.5 and having an inner face and an outer face,
   a layer on at least one of said inner face or said outer face of said plate of high density polymer forming a gas impermeable coating, and
   a first flange and a second flange sandwiching said plate of high density polymer and said layer therebetween with sufficient pressure to create a vacuum seal with said flanges exposed to a low pressure on one side and a higher pressure on the other side with said first flange milled out with a recessed area to accommodate said plate of high density polymer and said second flange having a flat facing side to buttress said plate of said high density polymer.

2. The window of claim 1 wherein said plate of high density polymer is high density polyethylene with a dielectric constant of approximately 2.1.

3. The window of claim 1 wherein said plate of high density polymer is polyethylene terethalate (PET).

4. The window of claim 1 wherein said layer is formed by deposition of a coating of a material selected from group consisting of SiO, SiO2, SiN, SiN2 or a combination thereof of the two.

5. The window of claim 1 wherein said flat face of said second flange contains a continuous raised ridge, inward of the outermost periphery of said plate of said high density polymer, said ridge effecting a continuous seal around the periphery of said plate of high density polymer when said flanges are fastened together.

6. The window of claim 1 wherein said low pressure is approximately $1\times10^{-8}$ Torr.

7. The window of claim 1 wherein said window will withstand a pressure differential of about 45 psi or higher between said inner face and said outer face when said plate is assembled between said flanges.

8. The window of claim 6 wherein said plate and said layer have a voltage standing wave ratio of less than 1.1 when high power, broad band microwave energy is passed therethrough.

9. A method of providing a microwave window including the following steps:

providing a plate of high density polymer having a dielectric constant of less than 2.5 and coated on at least one side with a gas impermeable coating that is transparent to microwave energy;

providing two complimentary flanges one of which has a flat recessed area and the other a flat area having a continuous closed sealing ridge; and tightening said complementary flanges together with said plate sandwiched therebetween to act as a sealing gasket and window as said ridge is imbedded into said plate.

* * * * *